United States Patent [19]

Fauvet et al.

[11] Patent Number: 4,670,831
[45] Date of Patent: Jun. 2, 1987

[54] METHOD AND APPARATUS FOR GENERATING A CONTROL POWER DELIVERED TO A LOAD BY A POLYPHASE POWER LINE

[75] Inventors: Jean-Pierre Fauvet, Maisons Laffitte; Jacques Parisel, Rueil Malmaison, both of France

[73] Assignee: La Telemecanique Electrique, France

[21] Appl. No.: 756,621

[22] Filed: Jul. 19, 1985

[30] Foreign Application Priority Data

Aug. 3, 1984 [FR] France ............................. 84 12320

[51] Int. Cl.$^4$ ............................................. H02P 13/26
[52] U.S. Cl. ........................................ 363/87; 363/129
[58] Field of Search ............... 323/235, 244, 300, 319; 363/85, 87, 88, 128, 129

[56] References Cited

U.S. PATENT DOCUMENTS

| 4,204,267 | 5/1980 | Kalinichenko | 363/85 |
| 4,347,562 | 8/1982 | Galloway | 363/87 |
| 4,399,395 | 8/1983 | Espelage | 363/87 X |
| 4,453,122 | 6/1984 | Johnson et al. | 323/300 |
| 4,490,780 | 12/1984 | Nondahl | 363/87 |
| 4,586,121 | 4/1986 | Gilliam | 363/87 |
| 4,599,685 | 7/1986 | Hombu et al. | 363/87 X |

FOREIGN PATENT DOCUMENTS 2112225 7/1983 United Kingdom ............... 323/300

Primary Examiner—Peter S. Wong
Assistant Examiner—Emanuel Todd Voeltz
Attorney, Agent, or Firm—William A. Drucker

[57] ABSTRACT

A microprocessor determines the zero cross-over times and direction of the phase voltages of the AC power line; a multiplexer has three parallel inputs which are respectively connected to the three phase conductors of the line and an output delivering a voltage formed by successive portions of the phase voltages; a flip-flop sensitive to the change of sign is connected to the output of the multiplexer; and EXCLUSIVE OR gate has an input connected to the output of the flip-flop and an other input to an output of the processor; and a NAND gate has an input connected to the output of the EXCLUSIVE OR gate and another input which receives a signal formed of a succession of square waves forming enabling windows.

7 Claims, 11 Drawing Figures

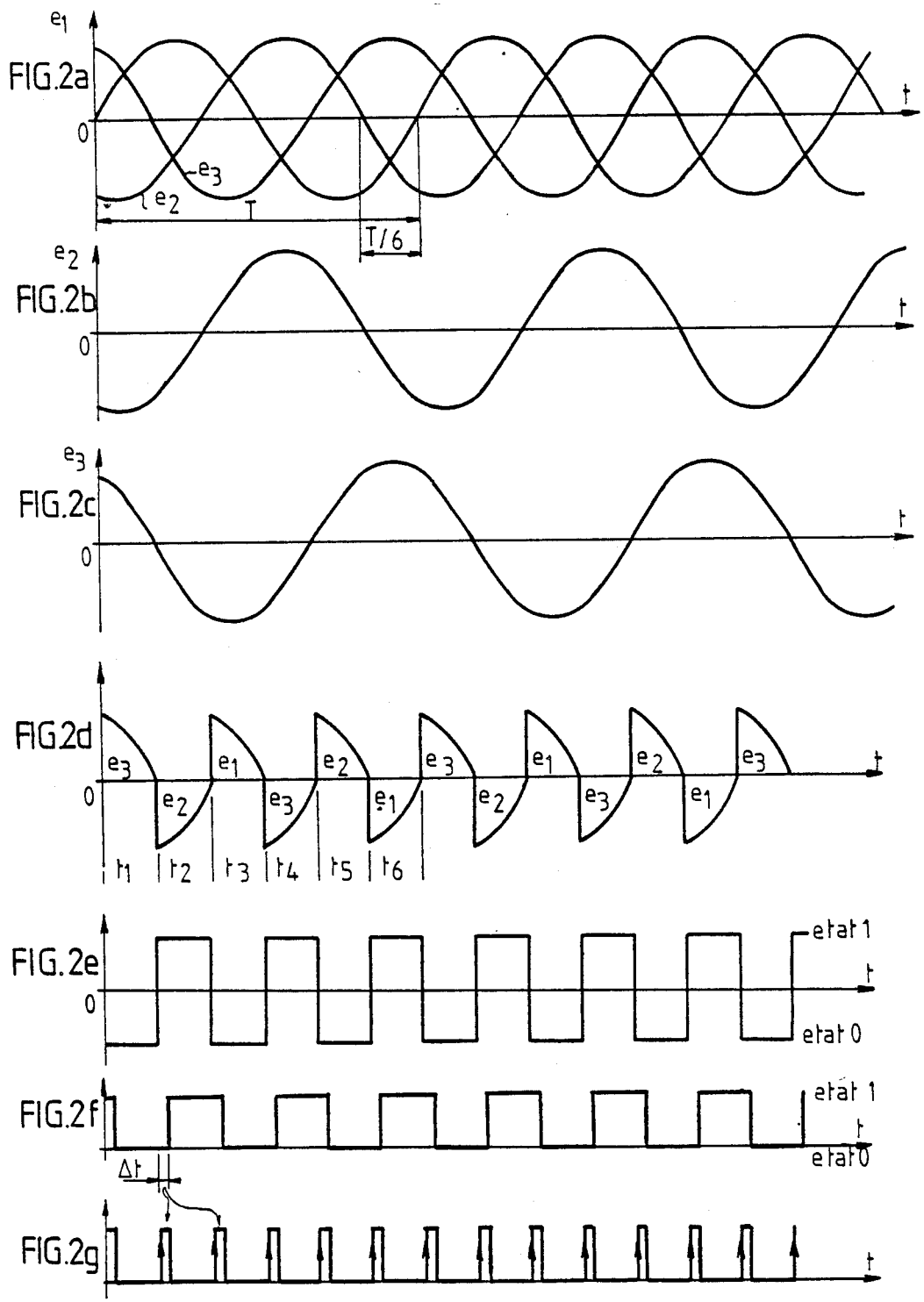

METHOD AND APPARATUS FOR GENERATING A CONTROL POWER DELIVERED TO A LOAD BY A POLYPHASE POWER LINE

BACKGROUND OF THE INVENTION

1. Field of the Invention

The present invention relates to a method and an apparatus for generating a control signal for semiconductor switches for controlling power delivered to a load by a polyphase AC power line, more particularly by using digital techniques.

It applies more particularly, but not exclusively, to the generation of the synchronization signal for the digital microprocessor control of an electronic speed variator for a DC motor using a controllable valve rectifier circuit, for example, a thyristor power bridge, of the Graetz circuit type, fed by a multi phase current.

2. Description of the Prior Art

It is known that in a three phase current variator of this kind, the rectifier circuit is usually formed of a bridge comprising three pairs of thyristors connected in the following way:

The two thyristors of each of the pairs are connected in series in the same direction.

The junction point between the two thyristors of the same pair is connected to a corresponding phase of the three phase network.

The two free ends of the thyristors of the same pair are connected respectively to the two power supply terminals of the motor.

This rectifier must further comprise a circuit for the successive switching on of thyristor pairs of the bridge in synchronism with the zero cross-overs of the compound voltages of the network, but with a certain phase shift $\Phi$.

Adjustment of the output voltage of this rectifier is then obtained by varying this phase shift $\Phi$.

It is clear that in order to control the switching of the different thyristor pairs, measures should be taken for accurately determining the times when the phase voltages of the network pass through zero while distinguishing them from each other and to determine if required, depending on the required voltage, the phase shift angle $\Phi$ with which, from this time, switching will be effected.

It should be noted in this connection that the idea of using the alternating voltage of the network for generating a synchronization signal which may serve for controlling the switching of a thristor bridge is not new. It is in fact easy to produce such a synchronization signal from detection of the time when the phase voltages of the network pass through zero (or even through a given value). However, the systems used are space consuming and expensive, because they necessarily require a three phase transformer with complex windings (direct winding and reverse winding).

SUMMARY OF THE INVENTION

To avoid these drawbacks the invention therefore provides a process for generation a synchronization signal, from the alternating voltage of the network, which uses only simple components and, in particular, single phase transformers which may be those used in the power supply circuit.

This process necessarily uses a digital system, for example a microprocessor system, which may advantageously consist of the one which uses the synchronization signal, for example for providing the slave control of the thyristors of a rectifier bridge such as the one previously described.

More precisely, the process of the invention comprises two successive phases, namely:

an initialization phase comprising:
 the measurement and/or checking of the period of the network by at least one count of the time between two zero cross-overs, with the same wave front, of a first phase voltage of the network.
 determination of the direction of rotation of the phase voltages of the network according to the signals of the other phase voltages of the network, at the time of zero cross-over with the same wave front of said first phase voltage of the network,
 generation of an incremental procedure for forecasting, as a function of said period and said direction, the zero cross-over times and the direction of the rising and falling wave fronts of different phases of the network during these zero cross-overs, and
an operating phase comprising:
 multiplexing of the phase voltages of the network depending on the previously determined direction of rotation of the phases, at the timing of the previously determined zero cross-over times,
 shaping of the signal produced by multiplexing into a first square wave signal,
 generation of a second square wave signal by inverting the rising wave fronts of said first square wave signal and,
 generating of the synchronization signal by detecting the falling wave fronts of said second square wave signal.

It should be noted that the choice of the type of wave front used for forming the synchronization signal is tied to the technology of the components, for example of the microprocessor used.

Thus, for example, in a similar way the second square wave signal could also be formed by inverting the falling wave fronts of the first square wave signal. In this case, the synchronization signal could be obtained by detecting the rising wave fronts of this second square wave signal.

The invention also aims at reducing, in the synchronization signal obtained in accordance with the previously defined process, the influence of disturbances which could occur not only in the network but also in the electronic circuit used.

For this, it uses first of all, for shaping the signal produced by multiplexing, a hysteresis flip-flop which only switches over when the phase voltage switched by the multiplexer changes sign. With this arrangement, any disturbance not causing a change of sign of the considered phase voltage of the network is not taken into account.

In addition, in the above described process, the wave fronts of the second square wave signal which are used for producing the synchronization signal are previously enabled, such enabling being provided by opening a gate (or window) close to the zero cross-over times of the phase voltages of the network, determined by said incremental procedure.

BRIEF DESCRIPTION OF THE DRAWINGS

Some embodiments of the invention will be described hereafter, by way of non limitative examples, with reference to the accompanying drawings in which:

FIGS. 2a to 2c are diagrams representative of the phase voltage curves of the network supplying the speed variator shown in FIG. 1.

FIGS. 2d to 2g are diagrams representing the output signals of the different stages of the device for generating, from the voltages of the network, the synchronization signal used by the microprocessor.

DESCRIPTION OF THE PREFERRED EMBODIMENTS

Figure 1:
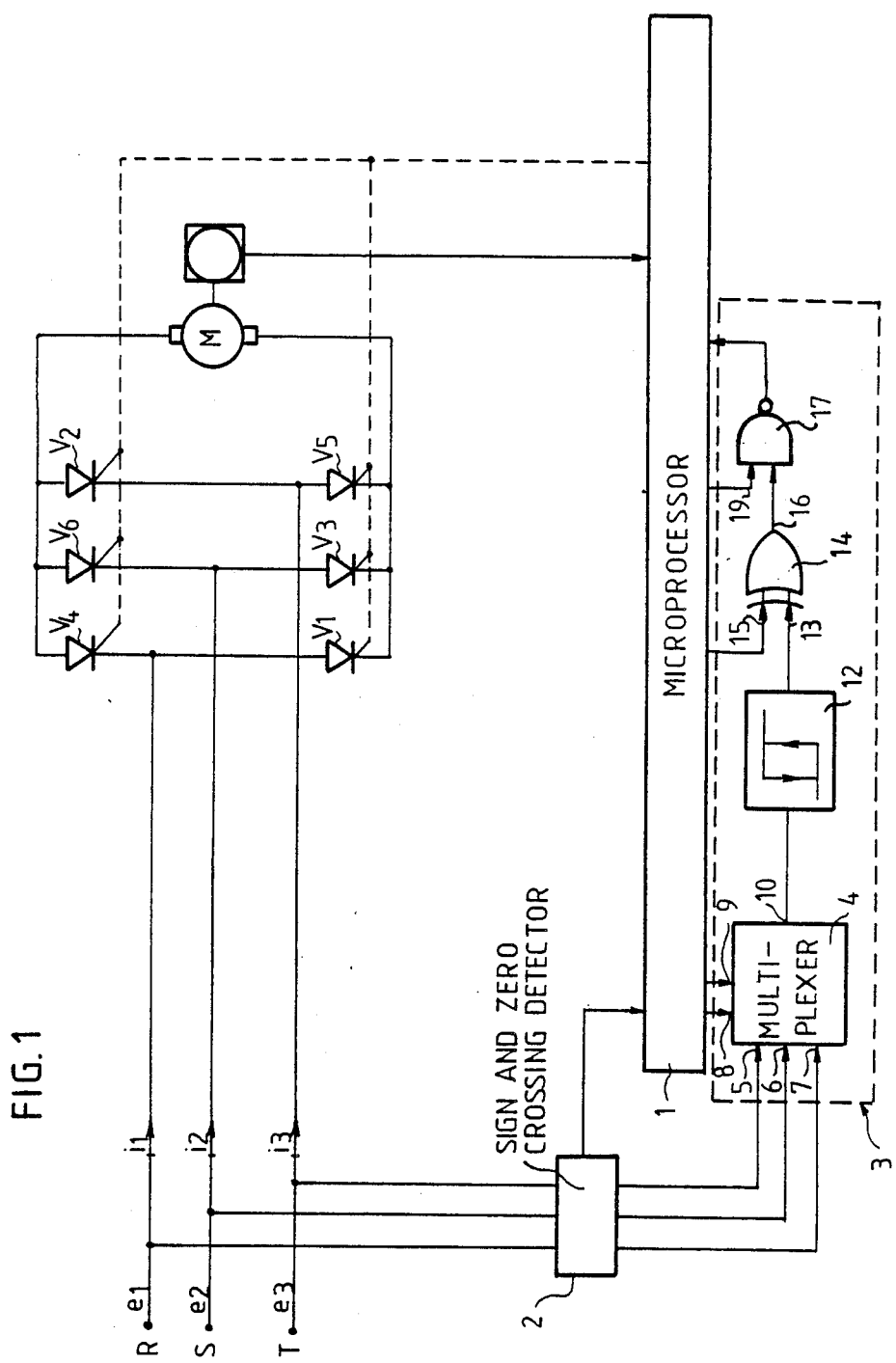
FIG. 1 is a partial schematic representation of a speed variator for a DC motor using a microprocessor.

The speed variator shown in FIG. 1 is fed with AC current from a three phase network whose three phase conductors RST present phase voltages $e_1$, $e_2$, $e_3$, and have currents $i_1$, $i_2$, $i_3$ flowing therethrough.

This speed variator comprises a thristor power bridge of the Graetz circuit type, formed by three pairs of thyristors $V_1$-$V_4$, $V_3$-$V_6$, $V_5$-$V_2$. The output of this power bridge is connected to a DC motor M.

The principle of a Graetz circuit is well known and will consequently not be described in detail. It should however be recalled that the voltage at the terminals of the three phase network is broken down into six compound voltages ($e_1$-$e_3$), ($e_2$-$e_3$), ($e_2$-$e_1$), ($e_3$-$e_1$), ($e_3$-$e_2$) and ($e_1$-$e_2$). All these compound voltages are phase shifted with respect to each other by 60°, so that the period of the voltage of the network is therefore broken down into six 60° zones (period T/6) defined by the zero cross-over times of these six compound voltages. To each of these zones there corresponds a conduction period of a given thyristor pair of the bridge. The variation of the mean voltage delivered by the bridge may therefore be regulated by varying the phase shift angle $\Phi$ with respect to the rectifier positive cross-over points (corresponding to the point of positive equality, at the same time, of two successive phase voltages of the network).

The switching control for the thyristors of the bridge may therefore be provided from determination of the following parameters:

- the zero cross-over times of the compound voltages of the network.
- the direction of rotation of the phase voltages $e_1$, $e_2$, $e_3$ of the RST network which allows the sequential order of the conduction periods of the thyristors to be defined, and
- the phase shift angle $\Phi$.

In this type of application, the aim of the invention is more particularly to provide a synchronization signal which, with a minimum cost, allows the control of the thyristors of the bridge to be ordered by a digital procedure.

As mentioned above, the first step in the process for generating the synchronization signal is an initialization step during which the valve of the period T of the network is measured and/or checked.

This measurement of period T may be advantageously accomplished by microprocessor 1, using a circuit 2 detecting the rising front zero cross-overs of one of the phase voltages $e_1$, $e_2$, $e_3$ of the network RST. In this case, during a rising front zero cross-over of the phase voltage considered, microprocessor 1 begins a time count which ends by the next rising front zero cross-over of the phase voltage. The count in this counter which corresponds to period T of the mains may then be stored and possibly compared with the theoretical period of the network. In the case of a considerable lack of concordance, a signalling means may be triggered off. Of course, this step of determining the period of the network may be repeated several times for checking.

The following initialization step consists in determining the direction of rotation of the phase voltages of the network, i.e. of the order in which these phase voltages follow each other.

This determination may be accomplished by means of circuit 2 by detecting, at the end of the preceding period measurement, when the phase voltage whose period is measured has again a rising front cross-over, the sign at this time of the other phase voltages. From this sign information, a simple table of truth allows the direction of rotation of phases $e_1$, $e_2$, $e_3$ to be determined, which allows the microprocessor 1, by means of a simple incremental procedure to evaluate, taking in to account the previously determined period T and said direction of rotation, the theoretical zero cross-over times and the direction, rising or falling of these zero cross-overs, of the different compound voltages of the mains.

Once this initialization step has been accomplished, the operating step of the process may be undertaken.

Generation of the synchronization signal during this phase implies the use of a circuit of the type contained in the block surrounded by a broken line 3 in FIG. 1.

This circuit first of all comprises a multiplexer 4 having at least three parallel inputs 5, 6, 7 connected respectively to the three phase conductors R, S, T of the network. Control of this multiplexer 4 is provided by the microprocessor which delivers two control bits to two respective control inputs 8, 9 which determine, as a function of the zero cross-over period, of the compound voltages of the mains and of the direction of rotation of these voltages, which of the phase voltages $e_1$, $e_2$, $e_3$, of the mains should be applied to the (series) output 10 of multiplexer 4.

By way of illustration, FIGS. 2a to 2c show the three respective voltage sinusoids of the three phases RST of the network. These three phases of the network are phase shifted with respect to each other by 60. In FIG. 2a, the voltage sinusoids $e_2$ and $e_3$ (respectively of phases S and T) have also been superimposed on the voltage sinusoid $e_1$ of phase R of the network so as to show the zero cross-over times ($t_1$ to $t_6$) of these curves and the zones of period T/6 between these times.

It should be noted that in FIGS. 2a to 2c the six compound voltages of the network have not been shown. In actual fact, only three of these six voltages are significant, the other three resulting by symmetry with respect to the axis of time.

FIG. 2d shows the form of the signal obtained at the output of multiplexer 4 which consists over a period T:

- between time 0 and time $t_1$, of the corresponding sinusoid portion (T/6) of the voltage $e_3$;
- between time $t_1$ and time $t_2$, of the corresponding sinusoid portion (T/6) of the voltage $e_2$;
- between time time $t_2$ and time $t_3$, of the corresponding sinusoid portion (T/6) of the voltage $e_1$;
- between time $t_3$ and time $t_4$ of the corresponding sinusoid portion (T/6) of the voltage ($e_3$);
- between time $t_4$ and time $t_5$, of the corresponding sinusoid portion (T/6) of the voltage ($e_2$), and
- between time $t_5$ and time $t_6$, of the corresponding sinusoid portion (T/6) of the voltage ($e_1$).

The signal produced by multiplexer 4 is then fed to a hysteresis comparator 12 adapted for switching only when the phase set by multiplexer 4 changes signal and exceeds a given threshold. This comparator 12 acts in the manner of a shaper for transforming the signal supplied by multiplexer 4 into a square wave signal (FIG. 2e) comprising a succession of positive square waves (level 1) and of negative square waves (level 0).

Because it only switches over for changes of sign of the phase voltages of the network and, beyond said threshold, this comparator 12 provides a first elimination of the disturbances of the network such for example, as switching gaps.

The square wave signal delivered by comparator 12 is then fed to one of the two inputs 13 of a logic circuit 14 of the "EXCLUSIVE OR" type, whose other input 15 receives a logic signal (FIG. 2f) formed by the microprocessor 1 as a functin of the zero cross-over times of the phase voltages of the mains and of the direction of rotation thereof.

This signal consists in a succession of positive square waves corresponding in period and duration to the negative square waves of the signal delivered by comparator 12, but slightly phase shifted with respect thereto.

The operation of this logic circuit is then as follows:

In the time preceding time $t_1$, the input 13 of circuit 14 which receives a negative signal (negative half wave of the signal of FIG. 2e) is at level 0, whereas the signal applied by the microprocessor to the input 15 is at level 0. The output 16 of circuit 14 will then be at level 0, and at time $t_1$ will switch to level 1, creating a rising front, following the passage of input 13 to level 1. The output of the circuit is kept at 1 until the signal applied by the microprocessor goes over to level 1. Thus at the output of the circuit a switching period $\Delta t$ is obtained.

The output 16 of circuit 14 is then at level 0 until time $t_2$ when the signal supplied by comparator 12 goes back to level 0, which causes the output 16 of circuit 14 to switch again to level 1 on a rising front. The output 16 of circuit 14 will then go back to level 0, after a new switching $\Delta t$, as soon as the signal produced by the microporcesor returns to level 0.

This operating cycle continues, so that at the output of the comparator a square wave signal is obtained whose falling fronts are in synchronism with the cross-overs of the compound voltages of the mains.

This signal is then fed to one of the two inputs of a logic circuit of the NAND type 17 for enabling the falling fronts of the signal supplied by the logic circuit 14. The second input of this NAND circuit receives a latching signal from the microprocessor.

Figure 3A:
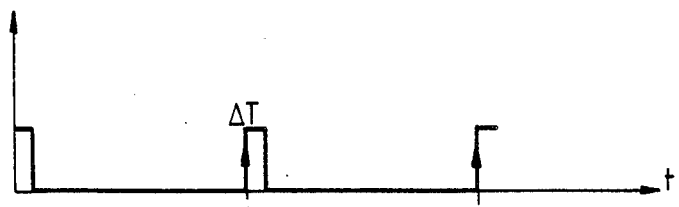
FIGS. 3a to 3c are diagrams illustrating the operation of the enabling window used for determining the synchronization times.
Figure 3B:
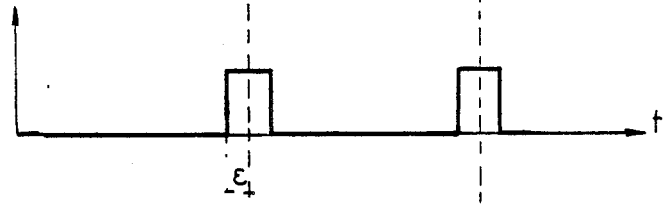
Figure 3C:
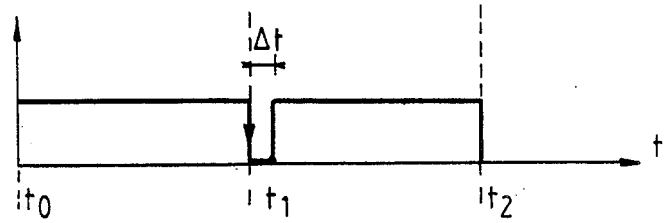

FIGS. 3a to 3c illustrate the operation of this circuit.

It will first of all be noted that FIG. 3a corresponds to the above described FIG. 2g, but in which, for ease of understanding, the square waves have been widened.

FIG. 3b shows the signal applied by the microprocessor to the input of the NAND circuit. This signal comprises a succession of square waves of period T/6 extending on each side of times $t_1$, $t_2$ ..., i.e. the times when the compound voltages of the network cross through zero. This signal may therefore be readily generated from the parameters determined during the initialization phase.

It can be seen that this signal allows the signal transmitted by the circuit during times T/6 $-\epsilon$ to be masked so that during this masking the disturbances which might occur upstream of circuit 17 are thus inhibited.

On the other hand, on approaching times $t_1$, $t_2$ ..., this signal passes to logic level 1 and so allows a change of level of the logic NAND circuit. When the rising front of the square waves of the signal produced by the logic circuit 14 then occurs at times $t_1$, $t_2$, the logic NAND circuit 17 goes back to logic level 0, thus creating a falling front useable by the microprocessor 1 for its synchronization.

Of course, this result could be obtained by means of an inverse logic circuit, by inverting the levels of the signal produced by the comparator and of the signals supplied by the microprocessor.

The signal delivered by the NAND circuit 17 may be used in numerous applications.

Thus, for example, in the case of the above described speed variator, it may serve both for synchronizing and sequentially fixing the thyristors $V_1$ to $V_6$ of the bridge and for determining, by synchronous integration, the mean value of the current delivered at the output of the bridge.

What is claimed is:

1. A method for generating a control signal for controlling synchronisation and commutation of semi-conductor switches coupled to a polyphase AC power line having at least first, second and third phase voltage phases shifted relative to each other according to a predetermined direction of rotation, said phase voltages each having an alternately positive and negative sign, rising and falling wave fronts and successive zero crossovers, comprising the steps of
   (a) measuring the time interval between two successive rising wave front zero cross-overs of the first phase voltage;
   (b) determining the signs of the second and third phase voltages at a predetermined cross-over of the first phase voltage and deriving said direction of rotation from said signs;
   (c) calculating, from said time interval and said direction of rotation, the zero cross-over times and the direction of the rising and falling wave fronts of the first, second and third phase voltages;
   (d) generating a voltage signal formed by periodically succeeding sequences, each comprising a portion of the third phase voltage between the rising zero cross-over of the first phase voltage and the succeeding falling zero cross-over of the third phase voltage, a portion of the second phase voltage between said succeeding falling zero cross-over of the third phase voltage between said succeeding rising zero cross-over of the second phase voltage and the succeeding falling zero cross-over of the first phase voltage;
   (e) shaping said voltage signal into a first square wave signal;
   (f) reversing the rising wave fronts of the first square wave signal to generate a second square wave signal; and
   (g) detecting the falling wave fronts of the second square wave signal for generating said control signal.

2. A method for generating a control signal for controlling synchronisation and commutation of semi-conductor switches coupled to a polyphase AC power line having at least first, second and third phase voltage phases shifted relative to each other according to a predetermined direction of rotation, said phase voltages each having an alternately positive and negative sign, rising and falling wave fronts and successive zero crossovers, comprising the steps of
  (a) measuring the time interval between successive rising wave front zero cross-overs of the first phase voltage;
  (b) determining the signs of the second and third phase voltages at a predetermined cross-over of the first phase voltage and deriving said direction of rotation from said signs;
  (c) calculating, from said time interval and said direction of rotation, the zero cross-over times and the direction of the rising and falling wave fronts of the first, second and third phase voltages;
  (d) generating a voltage signal formed by periodically succeeding sequences, each comprising a portion of the third phase voltage between the rising zero cross-over of the first phase voltage and the succeeding falling zero cross-over of the third phase voltage, a portion of the second phase voltage between said succeeding falling zero cross-over of the third phase voltage and the succeeding rising zero cross-over of the second phase voltage, and a portion of the first phase voltage between said succeeding rising zero cross-over of the second phase voltage and the succeeding falling zero cross-over of the first phase voltage;
  (e) shaping said voltage signal into a first square wave signal;
  (f) reversing the falling wave fronts of the first square wave signal to generate a second square wave signal; and
  (g) detecting the rising wave fronts of the second square wave signal for generating said control signal.

3. The method as claimed in claim 1, wherein said first square wave signal is obtained in step (e) by means of a hysteresis flip flop which switches over at each change of sign of each of said portions of the first, second and third phase voltages.

4. The method as claimed in claim 2, wherein said first square wave signal is obtained in step (e) by means of a hysteresis flip flop which switches over at each change of sign of each of said portions of the first, second and third phase voltages.

5. The method as claimed in claim 1, further comprising, between steps (f) and (g), an intermediate step during which the falling wave fronts of the second square wave signal are enabled a predetermined time delay after each zero crossing of the respective phase voltages, said time delay being substantially shorter than the duration of each of said portions.

6. The method as claimed in claim 2, further comprising, between steps (e) and (g), an intermediate step during which the rising wave fronts of the second square wave signal are enabled a predetermined time delay after each zero crossing of the respective phase voltages, said time delay being substantially shorter than the duration of each of said portions.

7. An apparatus for generating a control signal for controlling synchronisation and commutation of semiconductor switches coupled to a polyphase AC power line having at least first, second and third phase voltage phases shifted relative to each other according to a predetermined direction of rotation, said phase voltages each having an alternately positive and negative sign, rising and falling wave fronts and successive zero crossovers, said apparatus comprising:
  (a) detector means, connected to the polyphase power line, for generating digital signals representative of the zero cross-overs and of the signs of the first, second and third phase voltages;
  (b) counting means, connected to the detector means, for measuring and storing the time interval between two successive rising wave front zero cross-overs of the first phase voltage;
  (c) processor means having a table truth for determining the signs of the second and third phase voltages at a predetermined cross-over of the first phase voltage, deriving said direction of rotation from said signs and calculating, from said time interval and said direction of rotation, the zero cross-over times and the direction of the rising and falling wave fronts of the first, second and third phase voltages;
  (d) multiplexer means having first, second and third inputs connected to the polyphase power line and further inputs connected to the processor means, said multiplexer means having an output on which is generated a voltage signal formed by periodically succeeding sequences, each comprising a portion of the third phase voltage between the rising zero cross-over of the first phase voltage and the succeeding falling zero cross-over of the third phase voltage, a portion of the second phase voltage between said succeeding falling zero cross-over of the third phase voltage and the succeeding rising zero cross-over of the second phase voltage and a portion of the first phase voltage between said succeeding rising zero cross-over of the second phase voltage and the succeeding falling zero cross-over of the first phase voltage;
  (e) a hysteresis flip flop connected to the output of the multiplexer means, said flip flop switching over at each change of sign of each of said portions of the first, second and third phase voltages, said flip flop having an output on which a first square wave signal having alternate positive and negative portions is generated;
  (f) an EXCLUSIVE OR gate having first and second inputs and an output, the first input of the gate being connected to the output of the flip flop and said processor means further generating, on a further output of said processor means which is connected to the second input of the gate positive pulses each having the same duration as the negative-going portions of the first square wave signal and occuring a predetermined time delay after the respective zero crossings of the respective phase voltages, said time delay being substantially shorter than the interval between two succeeding zero crossings;
  (g) a NAND gate having first and second inputs and an output, the first input of the NAND gate being connected to the output of the EXCLUSIVE OR gate, said processor means further generating, on a second further output of said processor means which is connected to the second input of the NAND gate, enabling pulses which occur said predetermined time delay after the respective zero crossings of the respective phase voltages.

* * * * *